United States Patent [19]

Dykstra et al.

[11] Patent Number: 5,208,519

[45] Date of Patent: May 4, 1993

[54] ELECTRONIC SPEED GOVERNOR

[75] Inventors: Richard A. Dykstra, Cedar Grove; Douglas G. Janisch, Mequon, both of Wis.

[73] Assignee: Briggs & Stratton Corporation, Wauwatosa, Wis.

[21] Appl. No.: 653,081

[22] Filed: Feb. 7, 1991

[51] Int. Cl.⁵ .......................................... B63H 23/08
[52] U.S. Cl. ................................ 318/139; 318/434; 123/335; 123/352; 364/426.04
[58] Field of Search ............. 318/138, 139, 660–667, 318/560–660; 123/98, 102, 149 C, 149 D, 179.31, 198 D, 315, 333, 334, 335, 350, 352, 357, 361, 376, 426.01, 431.07, 418; 180/179; 364/431.11, 426.04

[56] References Cited

U.S. PATENT DOCUMENTS

| | | | |
|---|---|---|---|
| 3,651,793 | 3/1972 | Roth et al. | 123/102 |
| 3,738,340 | 6/1973 | Olson | 123/335 |
| 3,884,203 | 5/1975 | Cliffgard | 123/98 |
| 3,914,619 | 10/1975 | Talmage et al. | 123/352 |
| 4,034,725 | 7/1977 | Ito et al. | 123/105 E |
| 4,252,095 | 2/1981 | Janulmes | 123/329 |
| 4,385,601 | 5/1983 | Orova et al. | 123/335 |
| 4,403,970 | 9/1983 | Dretzka et al. | 123/335 X |
| 4,462,356 | 7/1984 | Hirt | 123/335 |
| 4,640,246 | 2/1987 | Sturdy | 123/350 |
| 4,875,448 | 10/1989 | Dykstra | 123/352 |
| 4,884,541 | 12/1989 | Marriott | 123/361 |
| 4,885,692 | 12/1989 | Kurihara et al. | 123/352 X |
| 4,936,274 | 6/1990 | Kozlov et al. | 123/352 X |
| 4,977,877 | 12/1990 | Dykstra | 123/335 |
| 5,038,879 | 8/1991 | Naito et al. | 123/352 |
| 5,085,286 | 2/1992 | Danzaki et al. | 123/352 X |

FOREIGN PATENT DOCUMENTS

2751213 5/1990 Fed. Rep. of Germany .

Primary Examiner—Paul Ip
Attorney, Agent, or Firm—Andrus, Sceales, Starke & Sawall

[57] ABSTRACT

An electronic governor is disclosed for power producing and power absorbing devices having a minimum number of component parts. Power for all of the electronic governor components is supplied by a small coil, thereby avoiding the need for an additional coil frame or other power source. In a preferred embodiment, power supply circuitry converts the alternating signal from the coil to a direct current signal to power the governor. A signal conditioner also provides a low state signal to a 555 timer to start the timing cycle. The length of the timing cycle, and thus the high state control signal output of the timer, is a function of the desired device speed. When the timer output is at a high state while at the same time the alternating signal from the coil is at its first polarity, one or more switches conduct to adjust an electromagnetic actuator. In one embodiment, the switches control a motor connected to an engine throttle and operated in a stepper mode. In another embodiment, the switch shunts a portion of the alternating signal from a capacitor connected across an electromagnetic throttle positioner, thereby partially closing the engine throttle.

33 Claims, 5 Drawing Sheets

ELECTRONIC SPEED GOVERNOR

BACKGROUND OF THE INVENTION

This invention relates to speed governors for power producing and absorbing devices such as for internal combustion engines, and more particularly to governors for small engines like those used on lawnmowers, snow blowers, generators and the like.

Automatic devices that cause power producing and absorbing machines to operate at a fixed speed are well known in the art. Such automatic devices are commonly referred to as "speed governors". Typically, such speed governors are either of the mechanical type or of the electronic type.

Various types of mechanical governors are well known in the art. However, such governors are often bulky, contain numerous moving parts, are expensive, and do not provide as accurate governing as electronic governors.

Many types of electronic speed governors are also well known in the art. Such electronic devices permit more accurate control of engine speed, but often contain many semiconductor components that thereby increases the cost of the governor. In addition, typical prior art electronic governors require a separate dc power source such as a battery to power the governor's electronic components. This also further increases the cost and complexity of the typical prior art governor.

SUMMARY OF THE INVENTION

An improved, low cost electronic speed governor is provided for power producing and absorbing devices, including engines, line-powered and alternator-powered electric motors, and dynamometers. The components of the governor are preferably all powered by a small coil added to an engine ignition coil frame if the governor is used on an engine. In the alternative, the engine ignition coil could be used to power the governor. If the governor is used on an electric motor, the governor may be powered by the AC line voltage or by an alternator. In any case, the use of either additional coil frames or power sources is avoided, thereby reducing the cost of the governor.

In its broadest concept, the invention includes an input means for receiving an alternating signal from a coil or other source that is indicative of the actual speed of the power-producing or power-absorbing device, and a signal conditioning means that receives the alternating signal and outputs a direct current signal to a timer means. A power supply means also receives the alternating signal from the coil and outputs a direct current power signal derived from the alternating signal to power the timer means.

The timer means preferably receives a low state direct current signal from the signal conditioning means and outputs a control signal whose high state has a preset pulse width corresponding to the desired or predetermined speed of the device.

The high state control signal output from the timer means is used in several ways to control the engine throttle position or an electromagnetic actuator. In the invention's broadest form, a first switch means is connected in circuit with both the input means and with the timer means, and conducts when both the control signal is in its first state, which is its high state, while at the same time the alternating signal is at a predetermined first polarity—which may be either positive or negative. When the first switch means conducts, an adjustment means adjusts the throttle position or actuator to thereby change the device's speed. The governor may also include a speed droop means for reducing the predetermined speed when a load is applied to the device.

In a preferred embodiment, the governor has a first switch means and a second switch means, both of which are connected in circuit with the input means and with the timer means. The first switch means—which may include one or more silicon-controlled rectifiers (SCRs)—is gated on when the control signal is at its high state while at the same time the alternating signal becomes positive-going. This condition indicates that the device's speed is too high. The adjustment means adjusts the actuator in a first direction when the first switch means is gated on to reduce the device's speed.

The second switch means is gated on when the control signal is at its low state at the same time that the alternating signal becomes positive-going. This condition indicates that the device's speed is too low. When the second switch means conducts, the adjustment means adjusts the actuator in an opposite second direction to increase the device's speed. The adjustment means preferably includes a dc motor used in a stepping mode whose rotatable shaft is connected to the actuator and is stepped in either the first direction or the second direction to adjust the actuator.

When the governor is used with an engine, the adjustment means adjusts the throttle position with each flywheel revolution, or two times per engine cycle. In all applications, the actuator is adjusted based upon currently-sensed information as to whether the actual device speed is above or below the predetermined set speed. Unlike many complicated and expensive prior art electronic governors, the governor according to the present invention does not consider how many revolutions it will take to reach the predetermined set speed, what actuator adjustments occurred during prior cycles of the device, or how far the actual speed is from the predetermined set speed in determining whether to adjust the actuator during the current cycle. Thus, the complicated feedback loops and memory circuits of prior art governors are avoided, thereby greatly reducing the governor's cost.

The preferred embodiment may also include a speed droop means having a feedback resistor and connected between the second switch means and the signal conditioning means. When an underspeed condition is sensed, a resistor is effectively switched in parallel with an input to the timer means to lengthen the high state pulse width of the control signal and thereby effectively reduce the predetermined set speed.

In another embodiment, the first switch means includes a triac that is gated on when both the control signal is in its high state and the alternating signal becomes negative-going. When the triac is gated on, a shunting means shunts a portion of the alternating signal—preferably the negative halfwave—away from a capacitor connected across a continuously variable electromagnetic throttle positioner or other actuator. This shunting prevents the capacitor from fully charging. The discharging of the capacitor during each cycle through the actuator causes the voltage to the actuator to be reduced, thereby changing the position of the actuator's rotatable drive shaft.

When the device's speed is below the predetermined speed, the control signal is in its low state when the alternating signal becomes negative-going. The triac is not gated on, no portion of the alternating signal is shunted, and the capacitor charges up to an increasing level. The discharging of the capacitor increases the voltage to the actuator to adjust the position of the actuator shaft in the opposite direction.

It is a feature and advantage of the present invention to provide a low cost electronic governor which uses a small coil to power all of the governor's components.

It is another feature and advantage of the present invention to use only currently-sensed device speed information and predetermined set speed information in deciding whether to adjust the actuator, thereby avoiding the use of complicated and expensive feedback loop and memory circuits in prior art governors.

It is yet another feature and advantage of the present invention to provide an electronic governor having a minimum number of integrated circuits and other semiconductor components.

These and other features and advantages of the present invention will be apparent to those skilled in the art from the following detailed description of preferred embodiments and the drawings, in which:

DETAILED DESCRIPTION OF PREFERRED EMBODIMENTS

The below descriptions and the drawings assume that the governor is being used to control the throttle position of an engine. However, the governor according to the prevent invention may be used to control the position of other electromagnetic actuators in power-producing and power-absorbing devices, such as electric motors and dynamometers to thereby control the actual speed of such devices.

Figure 1:
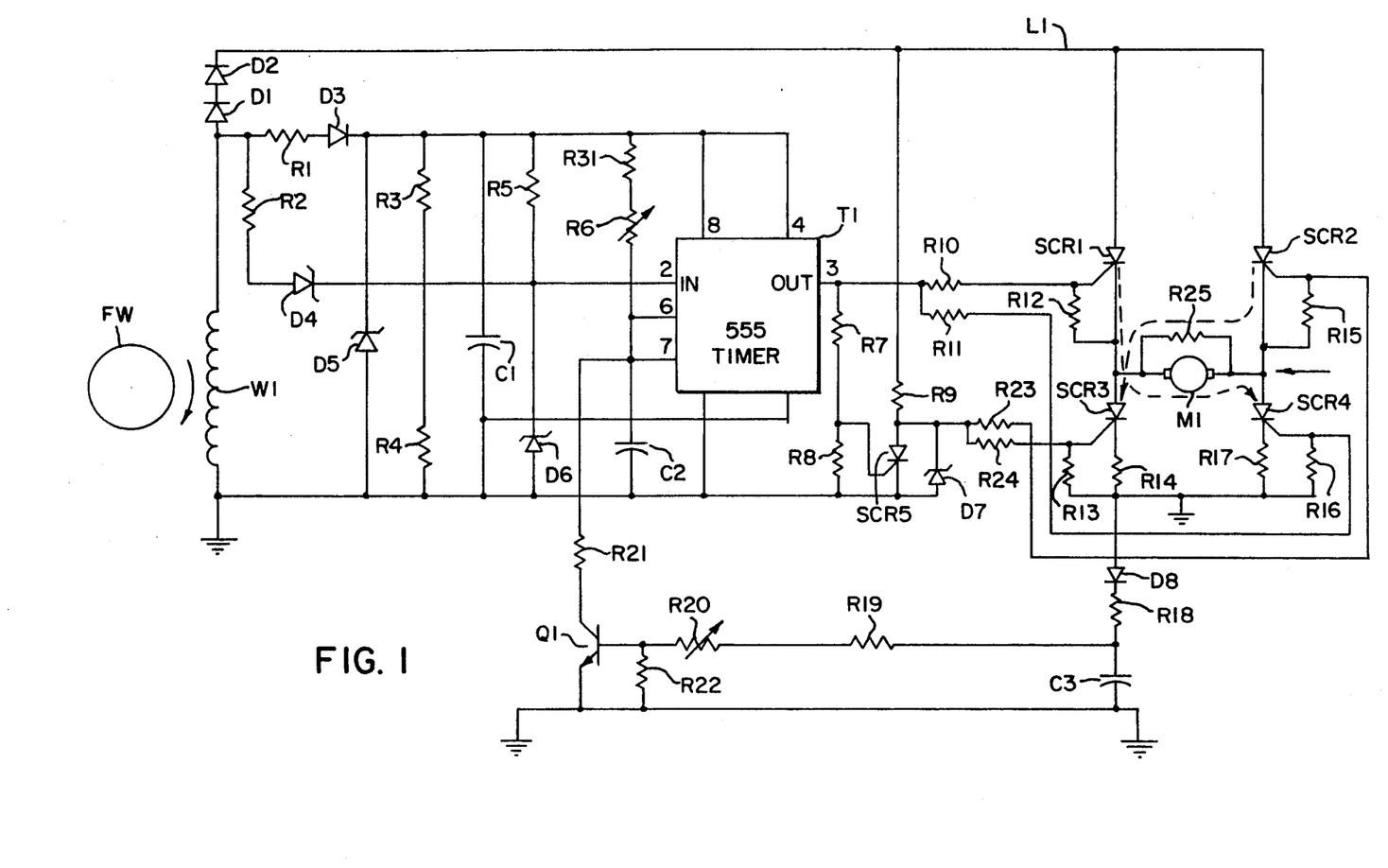
FIG. 1 is a schematic diagram of the preferred embodiment of the present invention.

FIG. 1 is a schematic diagram of the preferred embodiment of the present invention. The preferred embodiment depicted in FIG. 1 has an input means for receiving an alternating signal indicative of actual engine speed from winding W1, the signal resulting from rotation of a rotating flywheel FW. Winding W1 is preferably a single small coil having about 150-250 turns of No. 28 wire that is wound on one leg of the engine's ignition coil assembly and that generates a one pulse per revolution voltage signal of a leading negative voltage, a center positive voltage, and a following negative voltage with respect to ground.

In the alternative, winding W1 may be the ignition coil itself as long as the current required to power the governor—and particularly motor M1—does not significantly reduce the corresponding voltage needed to generate the ignition spark. Either a low current motor M1 or a larger ignition coil should be used to insure that an ignition spark of a sufficiently high voltage is generated.

The circuit depicted in FIG. 1 also includes a signal conditioning means that receives the alternating signal from winding W1 and outputs a direct current signal—preferably of a low state—to the input at pin 2 of 555 timer T1. The signal conditioning means consists of resistor R2, zener diode D4, resistor R5, and zener diode D6.

The input alternating signal is also used by a dc power supply to provide power to all the governor components including timer T1. The power supply consists of resistor R1, diode D3, zener diode D5, and capacitor C1.

Figure 8:
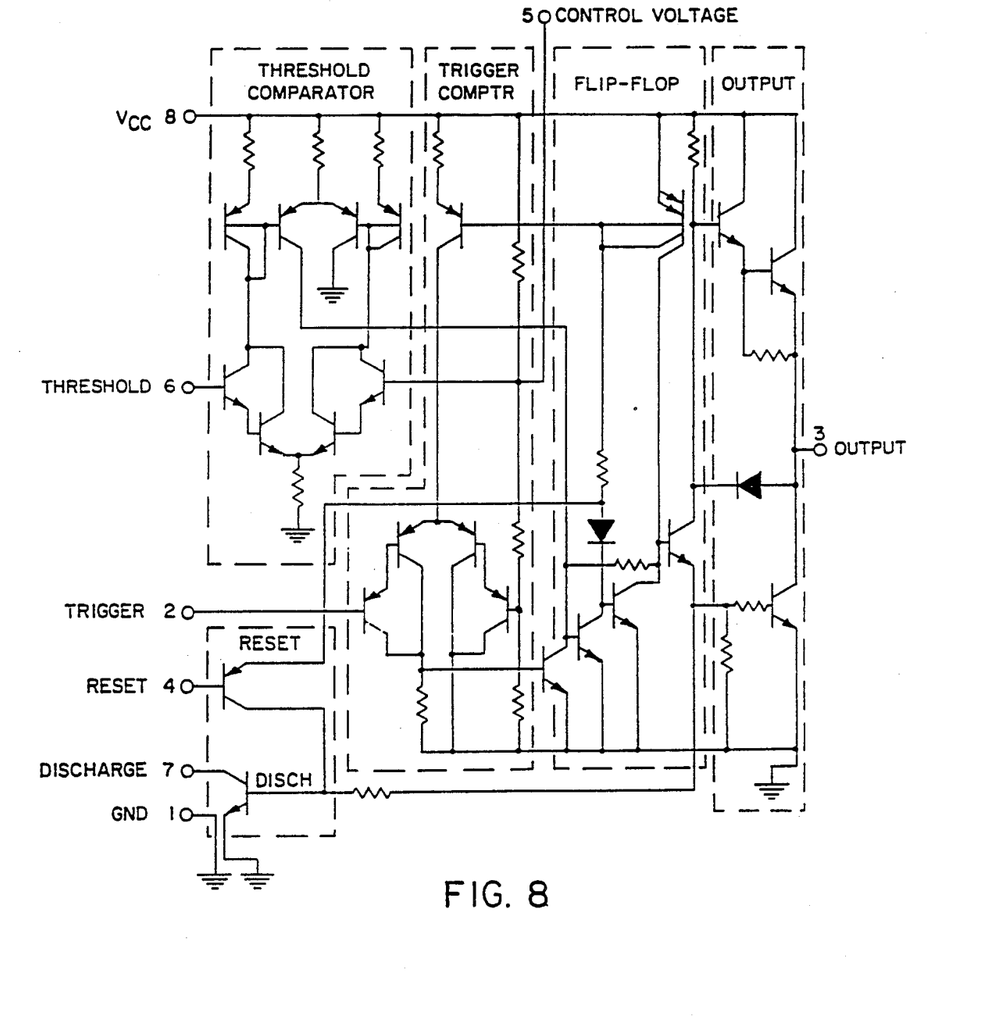
FIG. 8 is a schematic diagram of a 555 timer which may be used as the timer means in the present invention.

Resistor R6 and capacitor C2 are connected to input pins 6 and 7 of timer T1, and determine the pulse width of the high state output control signal of timer T1. The high state pulse width determines the desired engine speed. Optional resistor R31 is a limit resistor that prevents the set speed from becoming too high if resistor R6 is adjusted down to a zero resistance. Resistors R3 and R4 are connected as a voltage divider to pin 5 of timer T1, and are used to determine the control voltage to the timer which in turn affects the output control signal pulse width. The power supply also provides five volts of direct current at pins 4 and 8 of timer T1 to power the timer. Timer T1 is preferably a 555 timer such as Motorola Part No. MC1455, although other 555 timers or monostable multivibrators could be used. FIG. 8 is a schematic diagram of a Motorola MC1455 timer.

Connected to the output pin 3 of timer T1 is a first switch means consisting of silicon-controlled rectifier switches SCR1 and SCR4, which are connected together through a continuous dc motor M1 used in a stepping mode. Power to the network consisting of SCR1-SCR4 is provided from winding W1, through diodes D1 and D2, and via line L1. It is therefore apparent that coil winding W1 powers all of the governor components, including timer T1 and the SCR network.

Also connected to the output at pin 3 of timer T1 is a second switch means, consisting of SCR2 and SCR3. These switches are connected to each other through motor M1. Switch SCR5 prevents SCR2 and SCR3 from switching on when SCR1 and SCR4 are conducting. Without switch SCR5, a short-circuit could occur from SCR1 to SCR3, or from SCR2 to SCR4, thereby bypassing motor M1 altogether.

The circuit depicted in FIG. 1 also includes a speed droop means consisting of diode D8, resistors R18-R22, transistor Q1 and capacitor C3. The speed droop means includes a feedback resistor R14, which in turn is connected to the cathode of switch SCR3. The speed droop means is activated only when SCR2 and SCR3 are conducting, indicating that the actual engine speed is below the predetermined or desired engine speed. This underspeed condition typically occurs when a load has been applied to the engine. The purpose of the speed droop means is to effectively lower the predetermined engine set speed when an underspeed condition exists, and to prevent unnecessary speed oscillation above and below the predetermined engine speed for increased engine stability. The speed droop subcircuit is connected to pin 7 of timer T1, and essentially lengthens the predetermined high state pulse width of the timer's control signal output at pin 3 by about 10 percent. The lengthening of this pulse width reduces the likelihood that an underspeed condition will be found to exist, thereby reducing the likelihood that switches SCR2 and SCR3 will be gated on.

Figure 2:
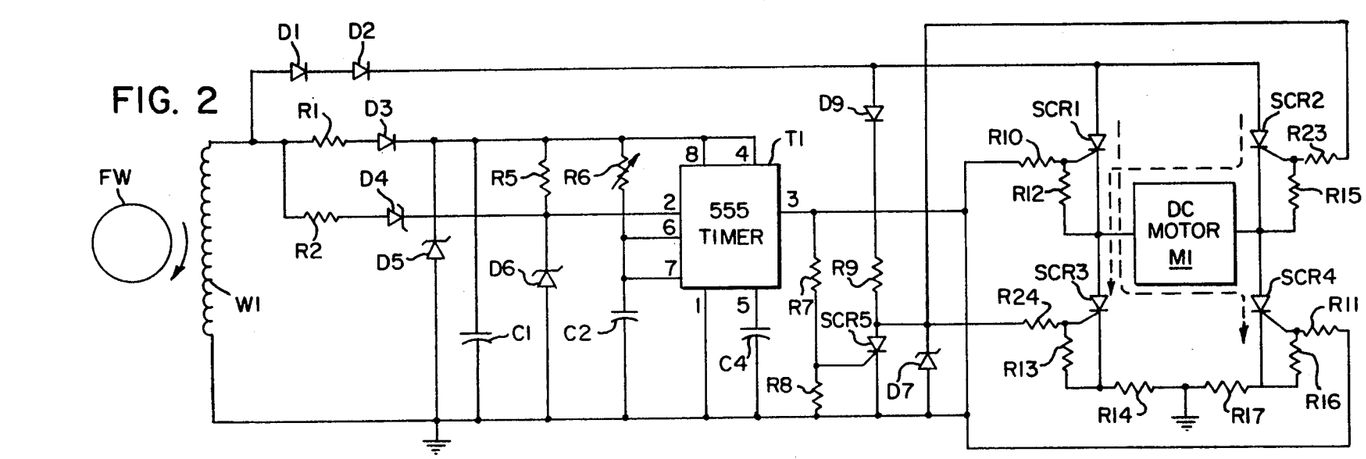
FIG. 2 is a schematic diagram of a second embodiment, without the temporary speed droop subcircuit in FIG. 1.

FIG. 2 is a schematic diagram of a second embodiment of the present invention. The embodiment depicted in FIG. 2 is very similar to that in FIG. 1, except that the speed droop subcircuit of FIG. 1 has been replaced by two resistors R14 and R17 in FIG. 2. Another significant difference between FIG. 1 and FIG. 2 is that FIG. 1 includes a damping resistor R25 connected across motor M1 to help prevent motor M1 from coasting after the signal from winding W1 is removed. In place of the voltage divider in FIG. 1, consisting of resistors R3 and R4 connected to pin 5 of timer T1, the schematic in FIG. 2 substitutes a capacitor C4 connected to pin 5. The purpose of the voltage divider and of capacitor C4 is to determine the timer's internal control voltage, thereby affecting the pulse width of the timer output control signal.

Figure 5:
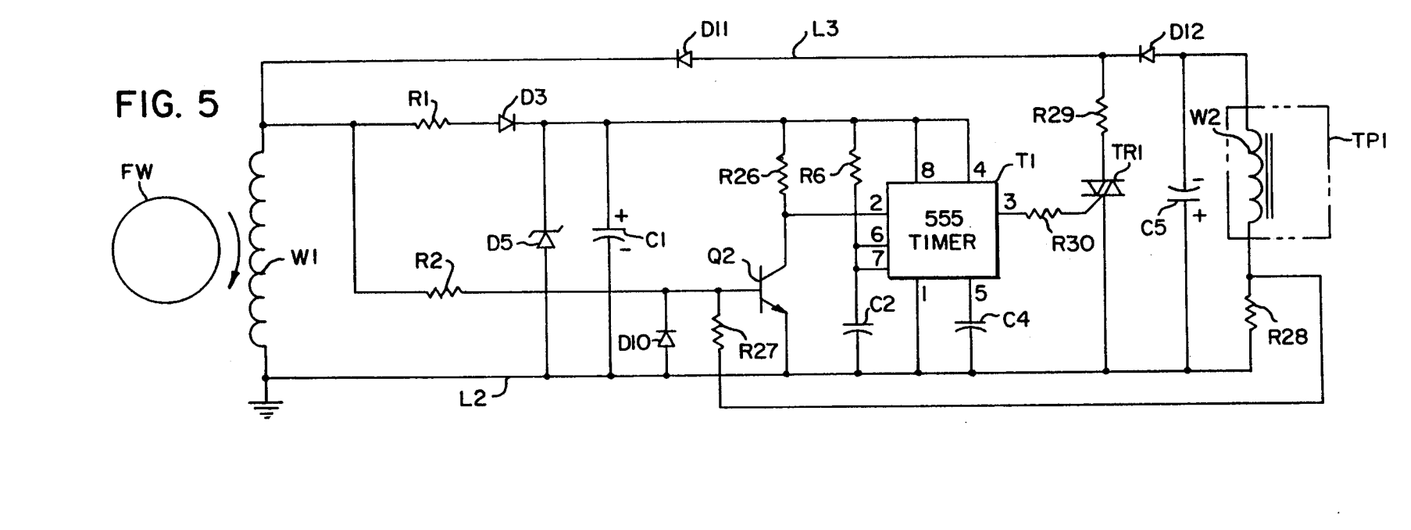
FIG. 5 is a schematic diagram of a third embodiment using an electromagnetic throttle positioner instead of the motor used in FIGS. 1 and 2.

In FIGS. 1 and 2, as in FIG. 5, components having corresponding functions have been given the same numerical designations, it being understood that the actual values of the components may differ between the various embodiments.

The operation of the embodiments depicted in FIGS. 1 and 2 will now be discussed. In FIGS. 1 and 2, an alternating signal having a positive polarity and a negative polarity is generated by winding W1 and is converted to a five volt dc signal for powering timer T1 by the power supply consisting of resistor R1, diode D3, zener diode D5 and capacitor C1. At the same time, the alternating signal is conditioned by the signal conditioning means as discussed above. The output of the signal conditioning means is a direct current signal having a high state and a low state. The signal conditioning means outputs a low state signal to the input at pin 2 of timer T1. When the input at pin 2 goes to the low state, the timing cycle of timer T1 begins. When there is no negative voltage signal from winding W1, pin 2 is held at a high voltage by pull-up resistor R5 which applies a positive five volts to pin 2. The only time pin 2 is brought to a low state is when the alternating signal from winding W1 goes negative with respect to ground.

The timing cycle of timer T1, and thus the pulse width of the high state output control signal from the timer, is determined by resistor R6 and capacitor C2. This timing cycle is predetermined, but depends on the size of the engine flywheel and the engine's ignition coil design. In a typical application, timing capacitor C2 is about 0.1 microfarad, and resistor R6 is on the order of ten to twenty thousand ohms.

After the signal at pin 2 goes to a low state, timer T1 outputs a control signal at pin 3 having a high state for a predetermined period of time. If the alternating signal becomes positive with respect to ground while the control signal is at its high state, switches SCR1 and SCR4 are gated on, thereby conducting the direct current signal provided from winding W1 through diodes D1 and D2. This indicates that an overspeed condition exists.

Figure 3A:
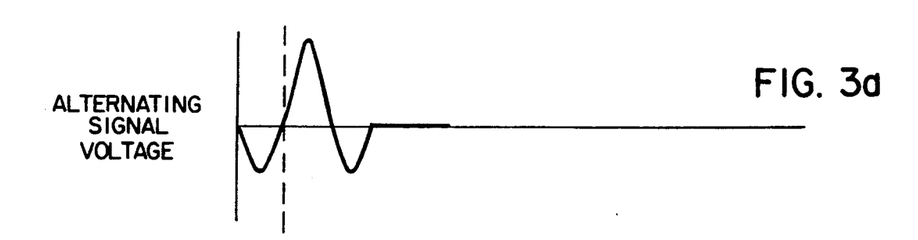
FIGS. 3(a)-3(c) are timing diagrams depicting the alternating signal, timer output/control signal, and dc motor current respectively of the first and second embodiments when the actual device speed is above the predetermined speed.
Figure 3B:
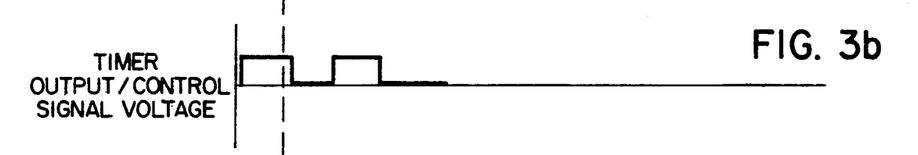
Figure 3C:
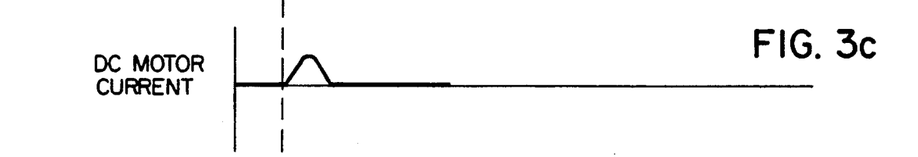

FIGS. 3(a) through 3(c) are timing diagrams relating to this overspeed condition. By comparing FIGS. 3(a) and 3(b), it is apparent that the alternating signal crosses zero and becomes positive-going while the control signal is in its high state. The dc motor is then energized, as shown in FIG. 3(c).

The conducting of SCR1 and SCR4 energizes dc motor M1 and rotates the shaft of the motor in a first direction to partially close the throttle. Motor M1 may be selected from a wide variety of small dc motors, although one suitable motor is a 30 rpm gear motor made by Hankscraft if a small coil is used for winding W1. Since SCR1 and SCR4 only conduct when an overspeed condition exists, the effect of the turning on of these switches is to reduce engine speed. When SCR1 and SCR4 are gated on, switch SCR5 is also gated on to prevent SCR2 and SCR3 from turning on.

If an underspeed condition exists, the control signal output at pin 3 of timer T1 will return to its low state before the alternating signal from winding W1 crosses zero and becomes positive with respect to ground. When the alternating signal subsequently becomes positive with respect to ground after the control signal returns to its low state, SCR1, SCR4 and SCR5 will not be turned on and instead SCR2 and SCR3 will be turned on. When switches SCR2 and SCR3 are turned on, rectified current flows through line L1 to motor M1 in the opposite direction than when switches SCR1 and SCR4 are turned on, causing the shaft of motor M1 to rotate in the opposite direction to open the throttle. The opening of the throttle increases engine speed.

Figure 4A:
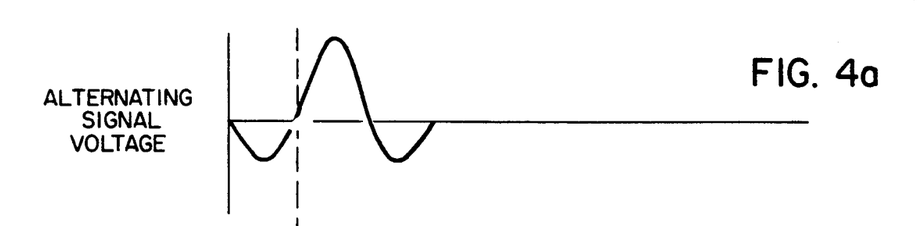
FIGS. 4(a)-4(c) are timing diagrams depicting the alternating signal, timer output/control signal, and dc motor current respectively of the first and second embodiments when the actual device speed is below the predetermined speed.
Figure 4B:
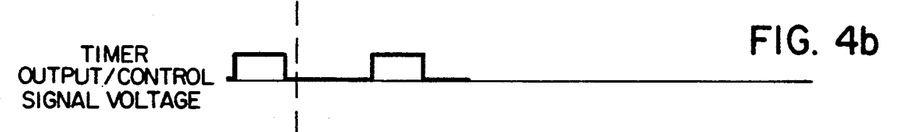
Figure 4C:
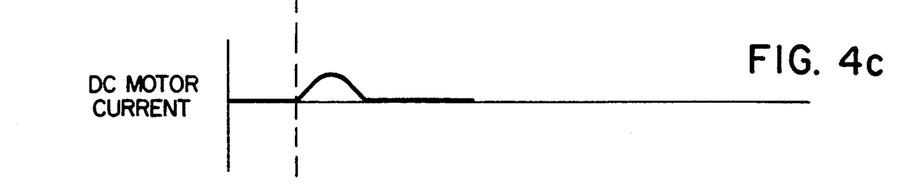

FIGS. 4(a) through 4(c) are timing diagrams relating to this underspeed condition. By comparing FIG. 4(a) with FIG. 4(b), it is apparent that the alternating signal becomes positive-going when the control signal is in its low state. The dc motor is then energized, as shown in FIG. 4(c).

Instead of using the positive-going alternating signal, the negative-going portion of the alternating signal could be used in the first and second embodiments to affect throttle position. In that case, the SCRs should be replaced with triac switches.

The temporary speed droop means of FIG. 1 is activated when SCR2 and SCR3 are gated on. Current flowing through SCR3 and resistor R14 charges a one microfarad capacitor C3 through diode D8 and resistor R18. Capacitor C3 charges rapidly, but discharges more slowly through transistor Q1. The output of transistor Q1 is connected to pin 7 of timer T1 through resistor R21. The effect of the speed droop circuit is to switch a parallel resistance to pin 7 to temporarily change the timer output control signal to indicate a lower set speed.

The embodiment depicted in FIG. 5 is similar to those in FIGS. 1 and 2, except that timer T1 is used to control a continuously-variable electromagnetic throttle positioner TP in FIG. 5 instead of a dc motor as depicted and described in connection with FIGS. 1 and 2. The embodiment of FIG. 5 also uses a triac as the first switch means instead of the SCRs in the other embodiments.

Referring now to FIG. 5, the power supply means consists of resistor R1, diode D3, zener diode D5 and capacitor C1. The power supply means receives an alternating signal from winding W1 and outputs a direct current signal to pins 4 and 8 of timer T1 to power timer T1. The power supply means operates as follows. When the output of winding W1 is positive, current flows through resistor R1 and diode D3 and into capacitor C1 to charge capacitor C1. The discharge of capacitor C1 provides dc power to the timer means. Diode D5 is a voltage-limiting zener diode.

The signal conditioning circuitry in FIG. 5 consists of transistor Q2, resistor R2, resistor R26, resistor R27, and diode D10, the latter limiting the emitter-base voltage of transistor Q2. Resistor R26 is a pull-up resistor which holds pin 2 at a high state until transistor Q2 is turned on. Transistor Q2 is turned on when the alternating signal becomes sufficiently positive, at which point pin 2 is brought to a low state. In the embodiments depicted in FIGS. 1 and 2, the timing cycle begins when the alternating signal is negative, whereas in FIG. 5 the timing cycle begins when the alternating signal is positive. After the timing cycle begins, timer T1 outputs a control signal having a high state of a preset pulse width at pin 3 through resistor R30 to the gate of triac TR1.

Figure 6A:
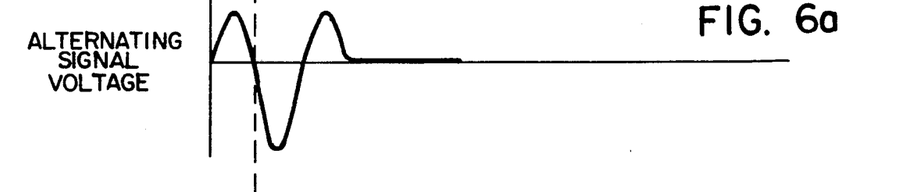
FIGS. 6(a)-6(c) are timing diagrams depicting the alternating signal, timer output/control signal, and throttle positioner voltage respectively of the third embodiment when the engine speed is above the predetermined speed.
Figure 6B:
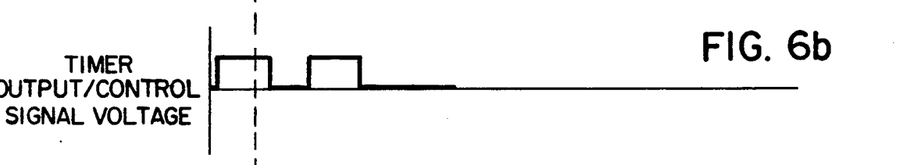
Figure 6C:
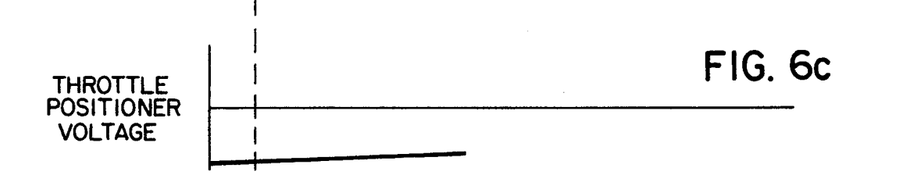

When an overspeed condition exists, the control signal output at pin 3 is still in its high state when the alternating signal from winding W1 becomes negative-going. See FIGS. 6(a) through 6(c). A comparison of FIG. 6(a) with FIG. 6(b) indicates that the alternating signal becomes negative-going when the control signal is in its high state. Triac TR1 is then gated on through resistor R30 by the high state control signal. When the triac conducts, the portion of the alternating signal which would otherwise energize throttle positioner TP1 is shunted through the triac back to winding W1 via lines L2 and L3, thereby reducing the voltage in the throttle positioner and partially closing the throttle.

Although the negative half-waves are shunted through the triac when an overspeed condition exists, diode D11 prevents the positive half-waves from being shunted through the triac. Diode D12 prevents positioner capacitor C5 from discharging through triac TR1 while the triac is conducting. The value of resistor R29 determines the voltage across the throttle positioner while triac TR1 is conducting.

When the actual engine speed is below the predetermined or desired engine speed, the control signal is in its low state when the alternating signal becomes negative-going. Triac TR1 is not gated on, and the half-wave of the alternating signal is used to charge capacitor C5. Capacitor C5 is connected across winding W2 of throttle positioner TP1, so that an increase in the voltage of capacitor C5 increases the voltage across the throttle positioner. The increase in voltage across the throttle positioner will open the throttle connected to the throttle positioner to increase engine speed.

Figure 7A:
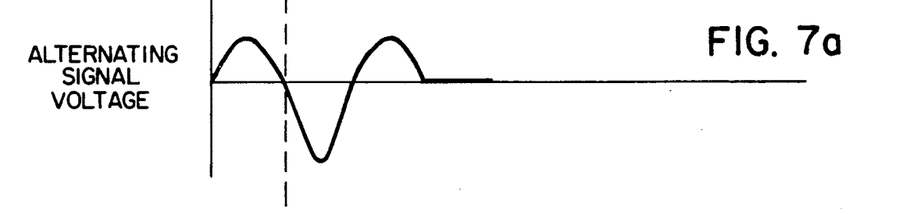
FIGS. 7(a)-7(c) are timing diagrams depicting the alternating signal, timer output/control signal, and throttle positioner voltage respectively of the third embodiment when the engine speed is below the predetermined speed.
Figure 7B:
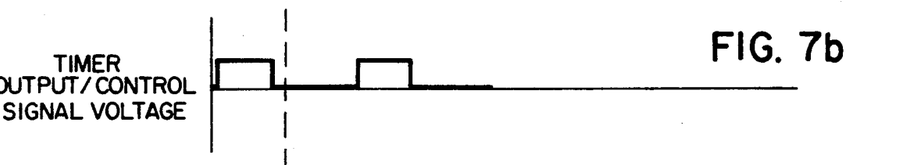
Figure 7C:
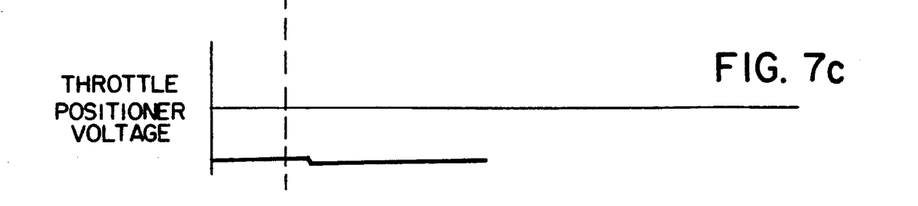

This underspeed condition is depicted by the timing diagrams in FIGS. 7(a) through 7(c). A comparison of FIGS. 7(a) and 7(b) indicates that the alternating signal becomes negative-going after the control signal returns to its low state.

In the alternative, a positive half-wave could be shunted instead of the negative half-wave in the third embodiment discussed above. In that case, an SCR switch should be used in place of triac TR1.

The speed droop means in FIG. 5 consists of a feedback resistor connected in series between throttle positioner TP1 and the signal conditioning means As current through the throttle positioner changes, resistor R28 changes the bias voltage that is applied to transistor Q2 through resistor R27. The changing of the transistor bias voltage decreases the effective predetermined engine speed with increasing load and increases the effective predetermined speed when the load is decreased.

Although specific embodiments of the invention have been shown and described, other alternate embodiments will be apparent to those skilled in the art and are within the intended scope of the present invention. Thus, the invention is to be limited only by the following claims.

We claim:

1. An electronic speed governor that maintains the actual speed of a device near a predetermined speed, comprising:
   input means for receiving an alternating signal indicative of actual speed, said alternating signal having a first polarity and a second polarity;
   signal conditioning means for receiving said alternating signal and for outputting a direct current signal;
   timer means for receiving said direct current signal and for outputting a control signal having a first state and a second state;
   first switch means, connected in circuit with both said input means and with said timer means, for gating on when both said control signal is in said first state while at the same time said alternating signal is at said first polarity; and
   adjustment means for adjusting the actual speed when said first switch means is gated on.

2. The speed governor of claim 1, further comprising:
   speed droop means for reducing said predetermined speed when a load is applied to said device.

3. The speed governor of claim 1, further comprising:
   coil means for outputting said alternating signal.

4. The speed governor of claim 1, further comprising:
   power supply means for receiving said alternating signal and for outputting a direct current power signal derived from said alternating signal that powers said timer means.

5. The speed governor of claim 1, wherein said timer means is a 555 timer.

6. The speed governor of claim 1, wherein said direct current signal has a high state and a low state, and wherein said signal conditioner means includes means for outputting said low state signal to said timer means.

7. The speed governor of claim 1, further comprising:
   a resistor and a capacitor connected to an input of said timer means that preset the first state pulse width of the control signal.

8. The speed governor of claim 1, wherein said first switch means includes a triac whose gate is in circuit connection with said timer means output.

9. The speed governor of claim 1, wherein said adjustment means includes means for shunting a portion of said alternating signal to thereby adjust the actual speed when said first switch means is gated on.

10. The speed governor of claim 1, wherein said adjustment means includes:
    an electromagnetic actuator; and
    a capacitor connected across said actuator that is charged by said alternating signal.

11. The speed governor of claim 10, further comprising:
    speed droop means for reducing said predetermined speed and connected between said actuator and said signal conditioning means, said speed droop means including a feedback resistor.

12. An electronic speed governor that maintains the actual speed of a device near a predetermined speed, comprising:

input means for receiving an alternating signal indicative of actual speed, said alternating signal having a first polarity and a second polarity;

signal conditioning means for receiving said alternating signal and for outputting a direct current signal;

timer means for receiving said direct current signal and for outputting a control signal having a first state and a second state, the pulse width of said first state being a function of the predetermined speed;

first switch means, connected in circuit with both said input means and with said timer means, for gating on when both said control signal is in its first state and said alternating signal is at its first polarity;

second switch means, connected in circuit with both said input means and with said timer means, for gating on when both said control signal is in its second state and said alternating signal is at its first polarity; and adjustment means for adjusting the actual speed in a first direction when said first switch means is gated on and for adjusting the actual speed in the opposite second direction when said second switch means is gated on.

13. The speed governor of claim 12, further comprising:

coil means for outputting said alternating signal.

14. The speed governor of claim 12, further comprising:

power supply means for receiving said alternating signal and for outputting a direct current power signal derived from said alternating signal that powers said timer means.

15. The speed governor of claim 12, wherein said timer means is a 555 timer.

16. The speed governor of claim 12, wherein said direct current signal has a high state and a low state, and wherein said signal conditioner means includes means for outputting said low state signal to said timer means.

17. The speed governor of claim 12, further comprising:

a resistor and a capacitor connected to an input of said timer means that preset the first state pulse width of the control signal.

18. The speed governor of claim 12, wherein said adjustment means includes a dc motor having a rotatable shaft whose rotation controls actual speed.

19. The speed governor of claim 12, wherein said first switch means includes at least one silicon-controlled-rectifier (SCR) whose gate is in circuit connection with said timer means output and whose SCR output is connected to said adjustment means.

20. The speed governor of claim 12, further comprising:

speed droop means for reducing said predetermined speed when a load is applied to said device.

21. The speed governor of claim 20, wherein said speed droop means is connected between said second switch means and said signal conditioning means, and wherein said speed droop means includes a feedback resistor.

22. The speed governor of claim 12, wherein said first state is a high state, said second state is a low state, said first polarity is a positive voltage with respect to ground, and said second polarity is a negative voltage with respect to ground.

23. An electronic speed governor that maintains the actual speed of a device near a predetermined speed, comprising:

input means for receiving an alternating signal indicative of actual speed, said alternating signal having a first polarity and a second polarity;

signal conditioning means for receiving said alternating signal and for outputting a direct current signal;

timer means for receiving said direct current signal and for outputting a control signal having a first state and a second state, the pulse width of said first state being a function of the predetermined speed;

first switch means, connected in circuit with both said input means and with said timer means, for gating on when both said control signal is in its first state and said alternating signal is at its first polarity;

adjustment means for adjusting the actual speed when said first switch means is gated on, said adjustment means including:

an electromagnetic actuator connected in circuit with said input means; and means for shunting a portion of said alternating signal to thereby adjust the actuator when said first switch means is gated on.

24. The speed governor of claim 23, further comprising:

speed droop means for reducing said predetermined speed when a load is applied to said device.

25. The speed governor of claim 24, wherein said speed droop means is connected between said actuator and said signal conditioning means, and wherein said speed droop means includes a feedback resistor.

26. The speed governor of claim 23, further comprising:

coil means for outputting said alternating signal.

27. The speed governor of claim 23, further comprising:

power supply means for receiving said alternating signal and for outputting a direct current power signal derived from said alternating signal to power said timer means.

28. The speed governor of claim 23, wherein said timer means is a 555 timer.

29. The speed governor of claim 23, wherein said direct current signal has a high state and a low state, and wherein said signal conditioning means includes means for outputting said low state signal to said timer means.

30. The speed governor of claim 23, further comprising:

a resistor and a capacitor connected to an input of said timer means that preset the first state pulse width of the control signal.

31. The speed governor of claim 23, wherein said first switch means includes a triac whose gate is in circuit connection with said timer means output.

32. The speed governor of claim 23, wherein said first state is a high stare, said second state is a low state, said first polarity is a negative voltage with respect to ground, and said second polarity is a positive voltage with respect to ground.

33. The speed governor of claim 23, wherein said first state is a high state, said second state is a low state, said first polarity is a positive voltage with respect to ground, and said second polarity is a negative voltage with respect to ground.

* * * * *

UNITED STATES PATENT AND TRADEMARK OFFICE
CERTIFICATE OF CORRECTION

PATENT NO. : 5,208,519

DATED : May 4, 1993

INVENTOR(S) : Dykstra, et al

It is certified that error appears in the above-indentified patent and that said Letters Patent is hereby corrected as shown below:

The title page should be deleted to appear as per attached title page.

In the drawings, sheet 1 consisting of Figure 1, should be deleted to be replaced with the corrected Figure 1, as shown on the attached page.

Column 10, line 59, claim 32, delete "stare" and substitute therefor --state--.

Signed and Sealed this

Twenty-eighth Day of June, 1994

Attest:

BRUCE LEHMAN

Attesting Officer

Commissioner of Patents and Trademarks

United States Patent [19]

Dykstra et al.

[11] Patent Number: 5,208,519
[45] Date of Patent: May 4, 1993

[54] ELECTRONIC SPEED GOVERNOR

[75] Inventors: Richard A. Dykstra, Cedar Grove; Douglas G. Janisch, Mequon, both of Wis.

[73] Assignee: Briggs & Stratton Corporation, Wauwatosa, Wis.

[21] Appl. No.: 653,081

[22] Filed: Feb. 7, 1991

[51] Int. Cl.$^5$ .............................................. B63H 23/08
[52] U.S. Cl. .................................. 318/139; 318/434; 123/335; 123/352; 364/426.04
[58] Field of Search ................ 318/138, 139, 660–667, 318/560–660; 123/98, 102, 149 C, 149 D, 179.31, 198 D, 315, 333, 334, 335, 350, 352, 357, 361, 376, 426.01, 431.07, 418; 180/179; 364/431.11, 426.04

[56] References Cited

U.S. PATENT DOCUMENTS

| | | | |
|---|---|---|---|
| 3,651,793 | 3/1972 | Roth et al. | 123/102 |
| 3,738,340 | 6/1973 | Olson | 123/335 |
| 3,884,203 | 5/1975 | Cliffgard | 123/98 |
| 3,914,619 | 10/1975 | Talmage et al. | 123/352 |
| 4,034,725 | 7/1977 | Ito et al. | 123/105 E |
| 4,252,095 | 2/1981 | Janulmes | 123/329 |
| 4,385,601 | 5/1983 | Orova et al. | 123/335 |
| 4,403,970 | 9/1983 | Dretzka et al. | 123/335 X |
| 4,462,356 | 7/1984 | Hirt | 123/335 |
| 4,640,246 | 2/1987 | Sturdy | 123/350 |
| 4,875,448 | 10/1989 | Dykstra | 123/352 |
| 4,884,541 | 12/1989 | Marriott | 123/361 |
| 4,885,692 | 12/1989 | Kurihara et al. | 123/352 X |
| 4,936,274 | 6/1990 | Kozlov et al. | 123/352 X |
| 4,977,877 | 12/1990 | Dykstra | 123/335 |
| 5,038,879 | 8/1991 | Naito et al. | 123/352 |
| 5,085,286 | 2/1992 | Danzaki et al. | 123/352 X |

FOREIGN PATENT DOCUMENTS

2751213  5/1990  Fed. Rep. of Germany .

Primary Examiner—Paul Ip
Attorney, Agent, or Firm—Andrus, Sceales, Starke & Sawall

[57] ABSTRACT

An electronic governor is disclosed for power producing and power absorbing devices having a minimum number of component parts. Power for all of the electronic governor components is supplied by a small coil, thereby avoiding the need for an additional coil frame or other power source. In a preferred embodiment, power supply circuitry converts the alternating signal from the coil to a direct current signal to power the governor. A signal conditioner also provides a low state signal to a 555 timer to start the timing cycle. The length of the timing cycle, and thus the high state control signal output of the timer, is a function of the desired device speed. When the timer output is at a high state while at the same time the alternating signal from the coil is at its first polarity, one or more switches conduct to adjust an electromagnetic actuator. In one embodiment, the switches control a motor connected to an engine throttle and operated in a stepper mode. In another embodiment, the switch shunts a portion of the alternating signal from a capacitor connected across an electromagnetic throttle positioner, thereby partially closing the engine throttle.

33 Claims, 5 Drawing Sheets

FIG. 1